(12) United States Patent
Cenac et al.

(10) Patent No.: US 8,701,699 B2
(45) Date of Patent: Apr. 22, 2014

(54) HOT TAPPING SEAL ASSEMBLY

(71) Applicant: BTI Services, Inc., Houston, TX (US)

(72) Inventors: Martin Cenac, Lafayette, LA (US); Richard J. Robichaux, Raceland, LA (US); John William Angers, Jr., Broussard, LA (US)

(73) Assignee: BTI Services, Inc., Houston, TX (US)

( * ) Notice: Subject to any disclaimer, the term of this patent is extended or adjusted under 35 U.S.C. 154(b) by 0 days.

(21) Appl. No.: 13/946,079

(22) Filed: Jul. 19, 2013

(65) Prior Publication Data
US 2013/0306162 A1 Nov. 21, 2013

Related U.S. Application Data

(63) Continuation of application No. 13/908,657, filed on Jun. 3, 2013, now abandoned, which is a continuation of application No. 13/104,397, filed on May 10, 2011, now Pat. No. 8,474,473, which is a continuation of application No. 12/276,863, filed on Nov. 24, 2008, now Pat. No. 7,938,137.

(60) Provisional application No. 60/990,498, filed on Nov. 27, 2007.

(51) Int. Cl.
*F16L 55/07* (2006.01)
*F16L 41/06* (2006.01)

(52) U.S. Cl.
USPC .............................. 137/317; 285/197

(58) Field of Classification Search
USPC .................... 137/317, 318; 285/197
See application file for complete search history.

(56) References Cited

U.S. PATENT DOCUMENTS

| | | | |
|---|---|---|---|
| 3,554,217 A * | 1/1971 | Ehrens et al. | 137/318 |
| 4,332,272 A | 6/1982 | Wendell | |
| 6,578,877 B1 * | 6/2003 | Sundholm | 285/197 |
| 6,648,377 B2 * | 11/2003 | Marandi | 285/197 |
| 7,021,325 B2 | 4/2006 | Maichel et al. | |
| 7,552,742 B2 | 6/2009 | Dole | |
| 7,938,137 B2 | 5/2011 | Cenac et al. | |
| 2010/0243072 A1 | 9/2010 | McGraw et al. | |

* cited by examiner

*Primary Examiner* — Kevin Lee
(74) *Attorney, Agent, or Firm* — Wong, Cabello, Lutsch, Rutherford & Brucculeri, LLP.

(57) ABSTRACT

A hot tapping assembly for hot tapping into a multiple string configuration to obtain access to the production tubing without removing outer layers of casing, the hot tapping assembly including a hot tapping clamp and a hot tapping seal assembly. In one embodiment, the hot tapping clamp includes a clamp plate having an access bore. The clamp plate can engage with an outer surface of a pipe. In another embodiment, the hot tapping seal assembly can engage with the hot tapping clamp, and includes a hot tapping tubular that can engage with the outer surface of the pipe through the hot tapping clamp's access bore.

9 Claims, 11 Drawing Sheets

HOT TAPPING SEAL ASSEMBLY

CROSS-REFERENCE TO RELATED APPLICATIONS

This application is a continuation of U.S. patent application Ser. No. 13/908,657, filed Jun. 3, 2013, now abandoned, which is a continuation of U.S. patent application Ser. No. 13/104,397, filed May 10, 2011 (issued as U.S. Pat. No. 8,474,473 on Jul. 2, 2013), which is a continuation of U.S. patent application Ser. No. 12/276,863, filed Nov. 24, 2008 (issued as U.S. Pat. No. 7,938,137 on May 10, 2011), which is a nonprovisional of U.S. Provisional Patent Application Ser. No. 60/990,498, filed Nov. 27, 2007, each of which is incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The process of the present invention relates to gaining access to the production tubing to vent fluid pressure within the tubing. More particularly, the present invention relates to a hot tapping system to vent pressurized fluids that eliminates the need to remove the outer layer of casing to obtain access to the production tubing.

2. General Background of the Invention

The conventional hot tap system is designed to allow hot tapping of the outer casing. For the conventional hot tap system, the outer casing must be removed by a process known as wedding caking to proceed to the next casing string. The conventional hot tap system takes more time and equipment to complete the same job as the Multiple String Hot Tap System. With more conventional Hot Tap System, the outer casing strings must first be hot tapped to release any trapped pressure in the casing or pump heavier fluid plug into the casing overcome the pressure. Once the pressure is released or controlled, a support structure can be attached to the outer casing for removal of a small section of the outer casing. This process is known as wedding caking; because each layer of casing is removed in layers. Once the small section of outer casing has been removed, the next casing string can now be hot tapped to gain control of this casing layer. The cycle of casing removal and hot tapping is repeated until the production tubing is reached. Once the production tubing has been hot tapped and the well bore has been controlled, the damage well casing and wellhead can be removed.

A temporary wellhead is installed on the well using the remaining casing. With the temporary wellhead in place, Plug and Abandonment operation can be started. The conventional hot tapping system could take several weeks to complete all of the hot tapping and vent of casing strings and production tubing. With a temporary wellhead installed, wireline or coil tubing operation can be used to lock open the SCSSV (surface control subsurface safety) with the manufacturers lock open tools. If there is pressure below the SCSSV, a bridge plug or tubing plug can be set to plug off the wellbore.

BRIEF SUMMARY OF THE INVENTION

What is provided is a method of hot tapping into a multiple string configuration for obtaining access to the production tubing without removing outer layers of casing by providing a multiple casing string that includes at least an outer casing and an inner casing or production string; mounting a clamp assembly around the wall of the outer casing; hot tapping a small opening through the outer casing wall to capture any pressurized fluid through the opening; cutting first and second large openings through the wall of the outer casing to access the inner casing, each opening being approximately 180 degrees from the other opening; through the first opening, drilling a small hole through the wall of the inner casing to capture any pressurized fluid through the opening in the inner casing; and inserting an anvil through the second opening to contact and stabilize the wall of the inner casing to prevent the casing from moving while the casing is drilled.

The multiple string hot tap system is a hot tapping system that eliminates the need to remove the outer layers of casing to obtain access to the production tubing. The system is designed around a unique hot tap clamping system which has a 4 or 6 inch diameter bore in the center of the clamps. This bore in the center of the clamps will be used to drill an access hole in the outer casing after the casing has been hot tapped. The access holes are later used to hot tap the next casing string.

The multiple string hot tap system eliminates the need for removal of the outer layers of casing to gain access to the inner layers of casing and the production tubing. The system designed around two clamps (a front clamp and a rear clamp). The two clamps are connected together with four chains. The chains are tensioned by applying torque to the nuts on the chain connector. The tension on the chains is based on the outer casing or surface casing size, wall thickness and material properties. If the chains are tensioned too high, the casing will fall in collapse. The maximum hot tapping pressure for the assembly is controlled by the outer casing specification and the specific set up of the multiple string hot tap assembly. The maximum hot tapping pressure can be increased by adding tension chains and increasing clamp bearing area.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
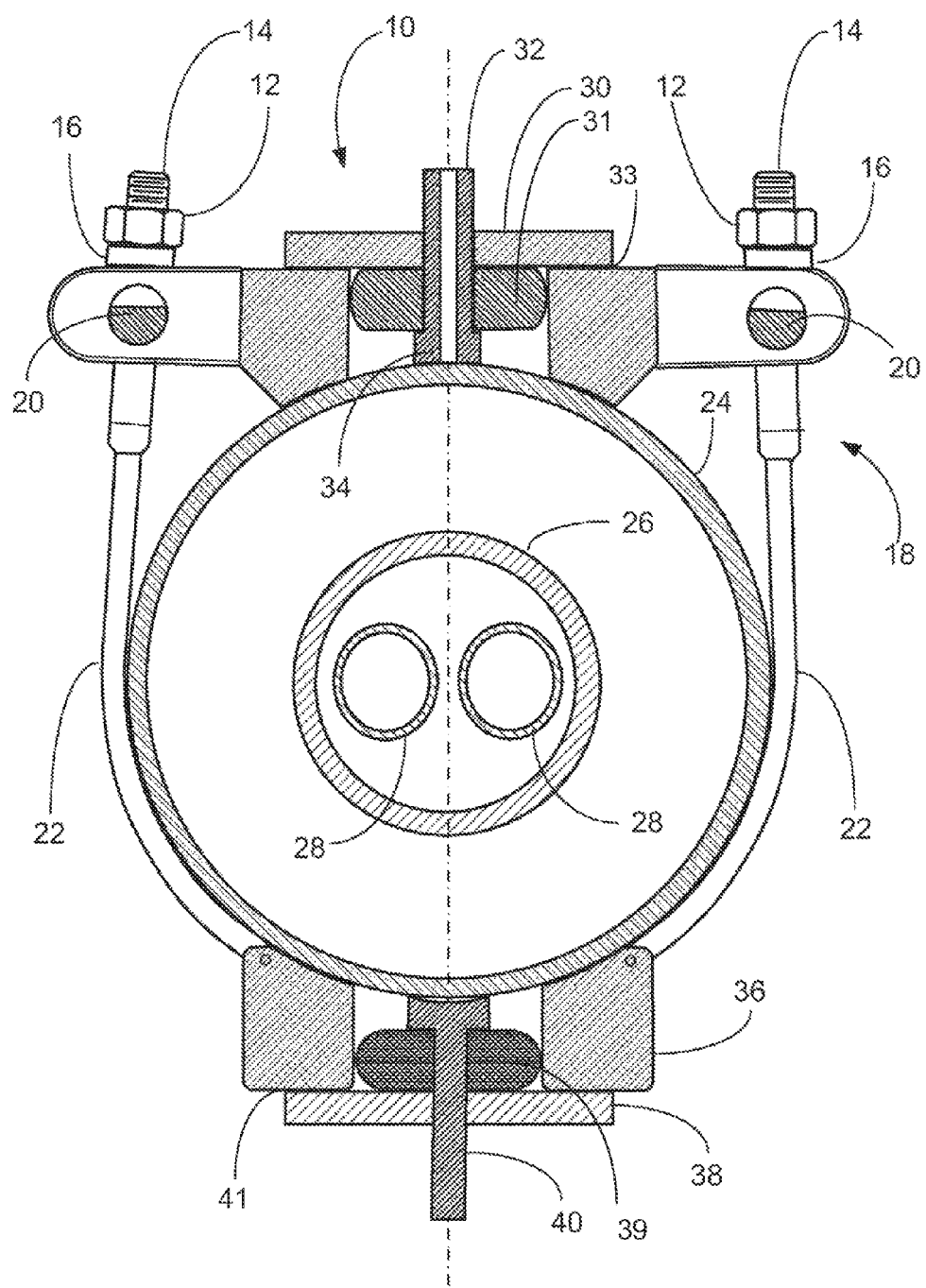
FIG. 1 illustrates a cross sectional view of the hot tap assembly in the system of the present invention.
Figure 2:
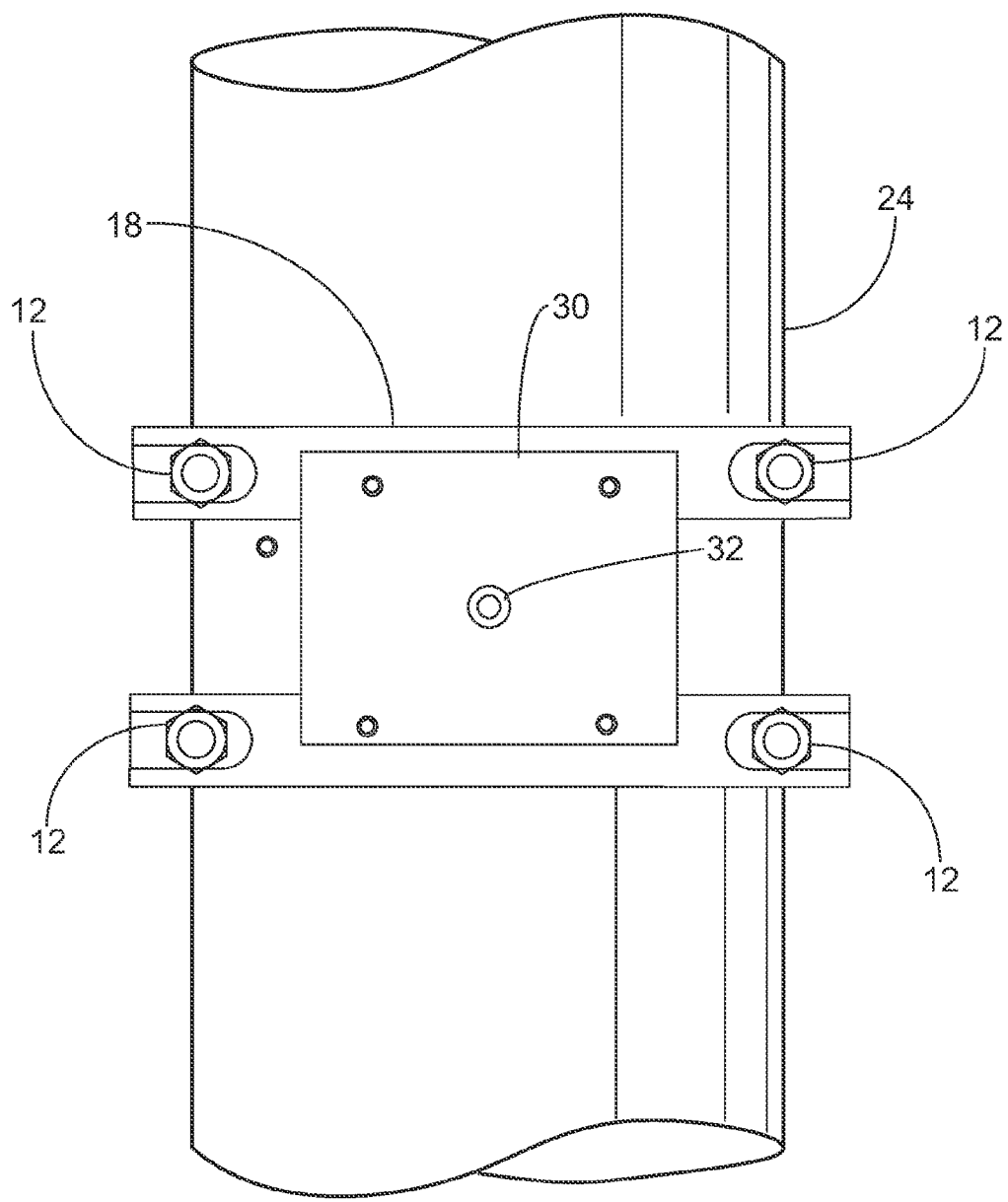
FIG. 2 illustrates a front view of the hot tap assembly of the present invention.
Figure 3:
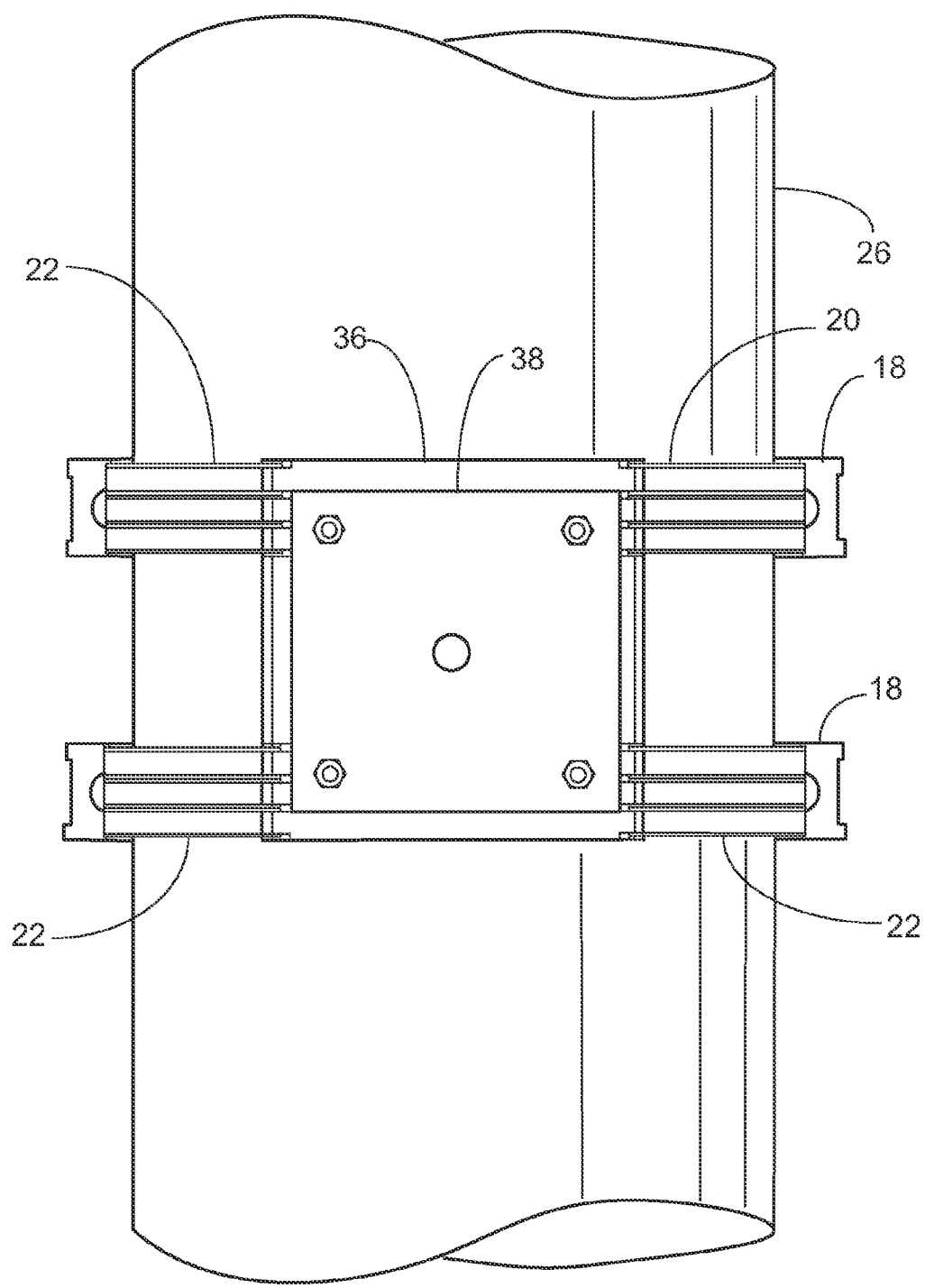
FIG. 3 illustrates a rear view of the hot tap assembly of the present invention.
Figure 4:
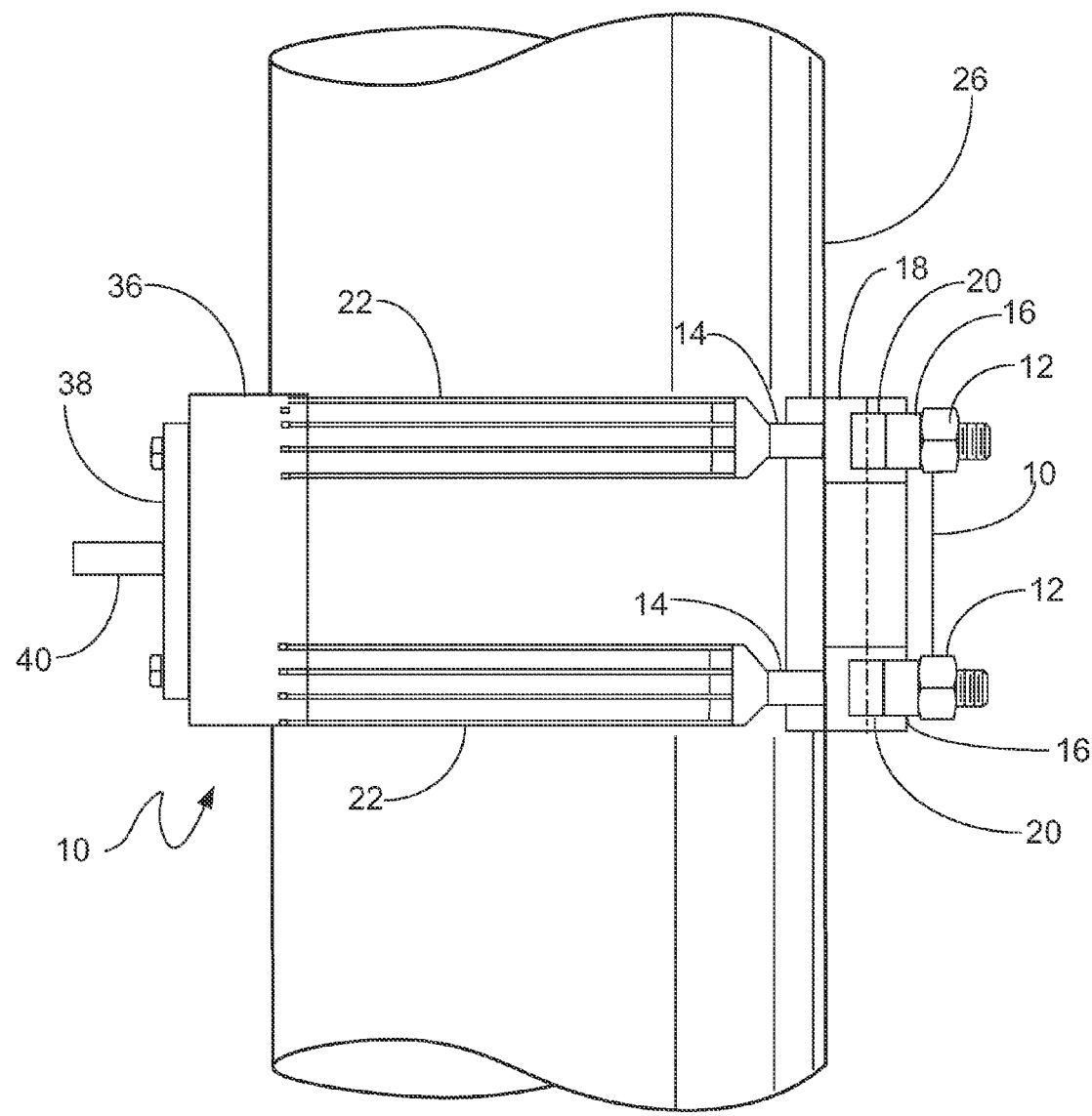
FIG. 4 illustrates a side view of the hot tap assembly of the present invention.
Figure 5:
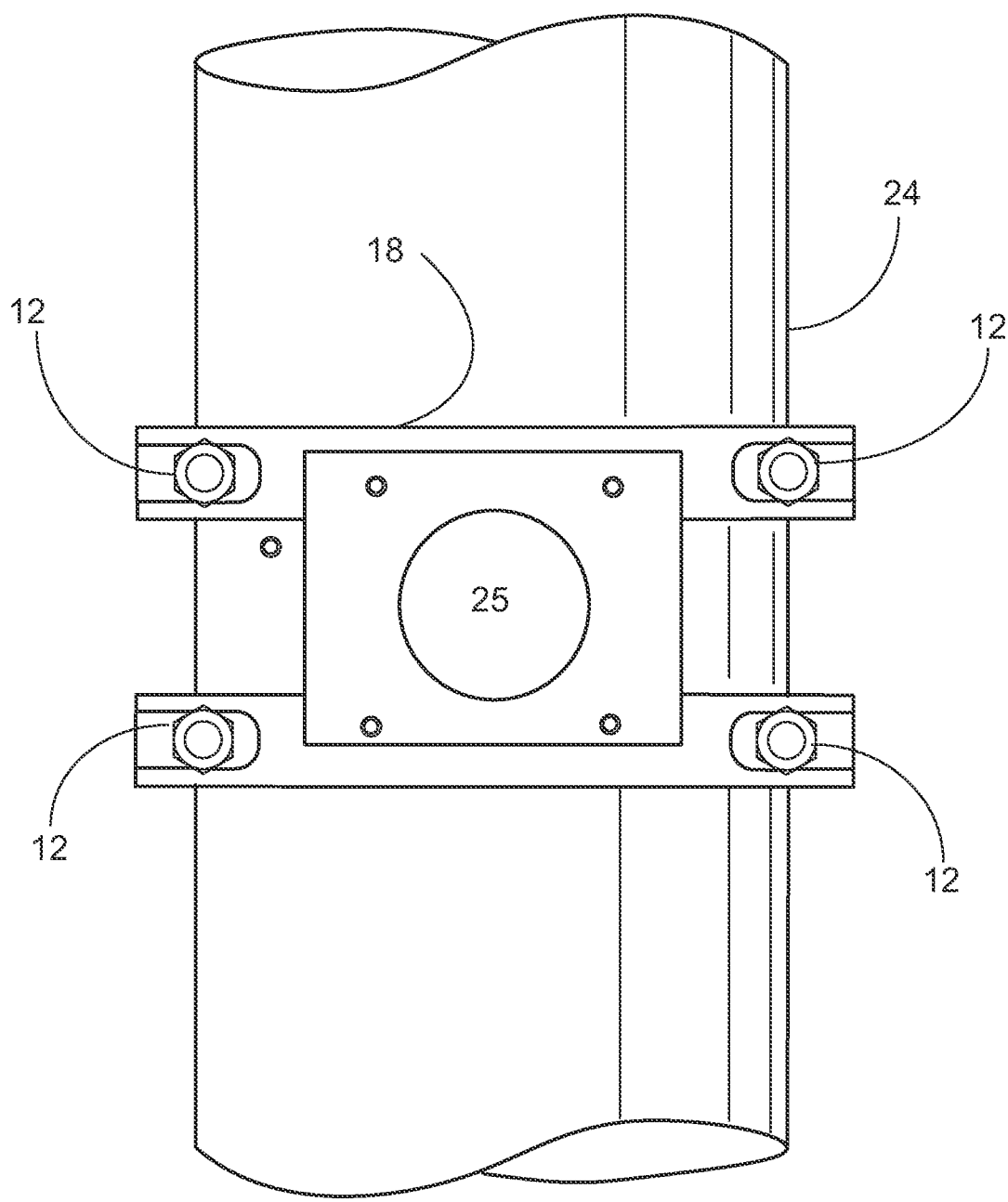
FIG. 5 illustrates a front view of the hot tap assembly of the present invention with front plate removed.
Figure 6:
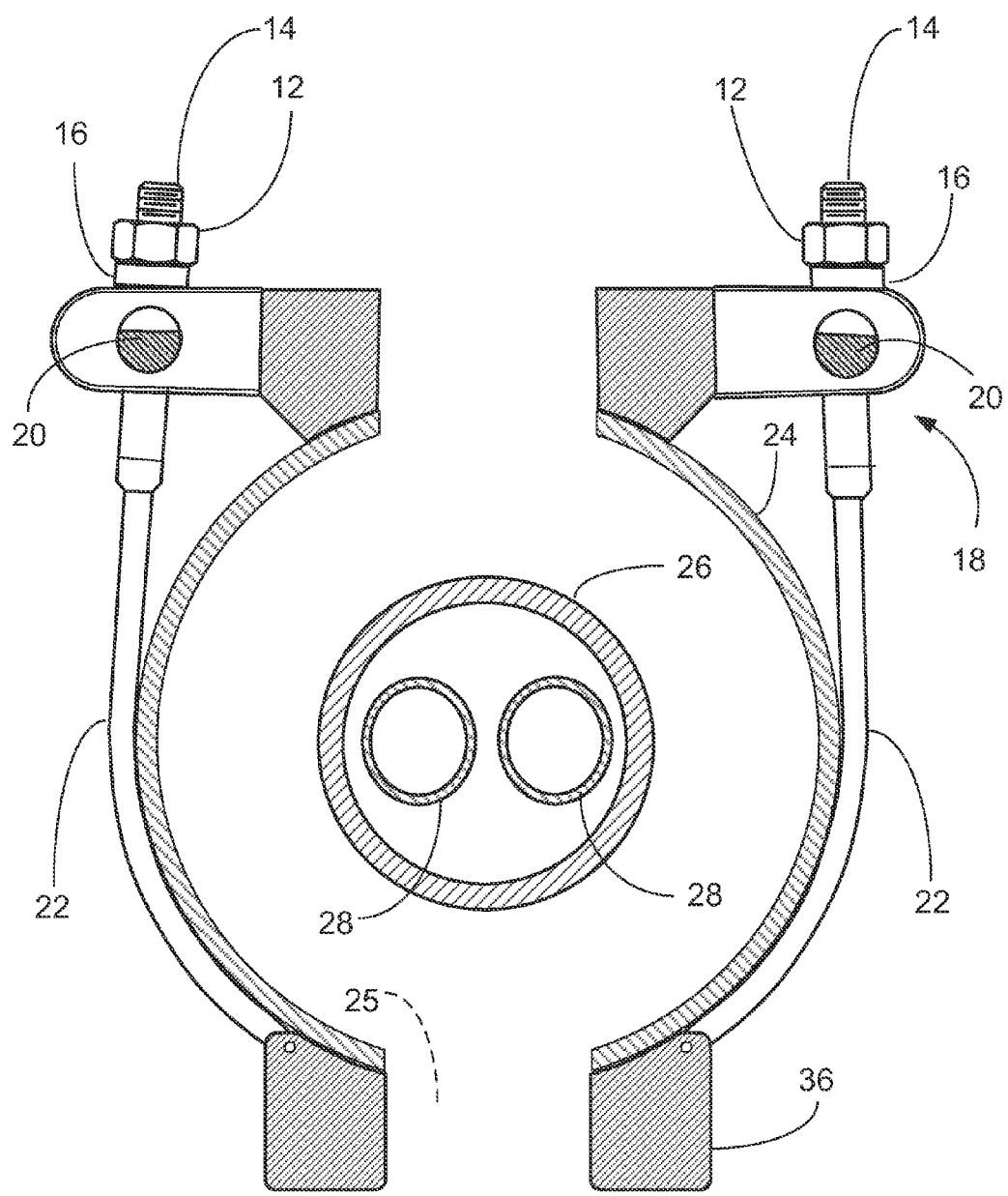
FIG. 6 illustrates a cross-section view of the hot tap assembly of the present invention with access holes.

As will be seen more clearly in FIGS. 1 through 13, the method of the present invention relates to hot tapping a damaged oil well to release any pressure within the layers of casing or pipe, without removing the outer casing string to access inner casing strings and production tubing. The novel method utilizes a multiple string hot tap system 10, also referred to as the novel System 10. The equipment is designed to allow hot tapping of each string of pipe in the completion without removal of the support clamps.

In the present system, as illustrated in the various FIGS. 1 through 13, a front clamp 18 and a rear clamp 36 are connected together with four tension chains 22. The chains 22 are tensioned by applying torque to the nuts 10 on the chain connectors 14. The tension on the chains 22 is based on the outer casing size, wall thickness, and material properties. If the chains 22 are tensioned too high, the casing 24 will fall and collapse. This amount of tension in the chains 22 will also control the maximum pressure that the hot tap assembly 10 can operate at or drill.

With the novel System 10, each casing string 24 is first hot tapped with a standard hot tap drill. The hot tap drill size is generally a ½ to ¾ inch diameter. After each casing string has been drilled, access holes 25 are bored. The access holes provide a way to extend the hot tap seal saddle tubular 32 to the next casing string 26 or the production tubing 28. The access holes 25 are generally 6 inches in diameter for casing sizes larger than 9 inches in diameter. For casing size smaller than 9 inches in diameter, the access hole can be as small as 3 inches in diameter. The process is repeated for each inner casing string until the production tubing is reached without removing each casing string.

Figure 7:
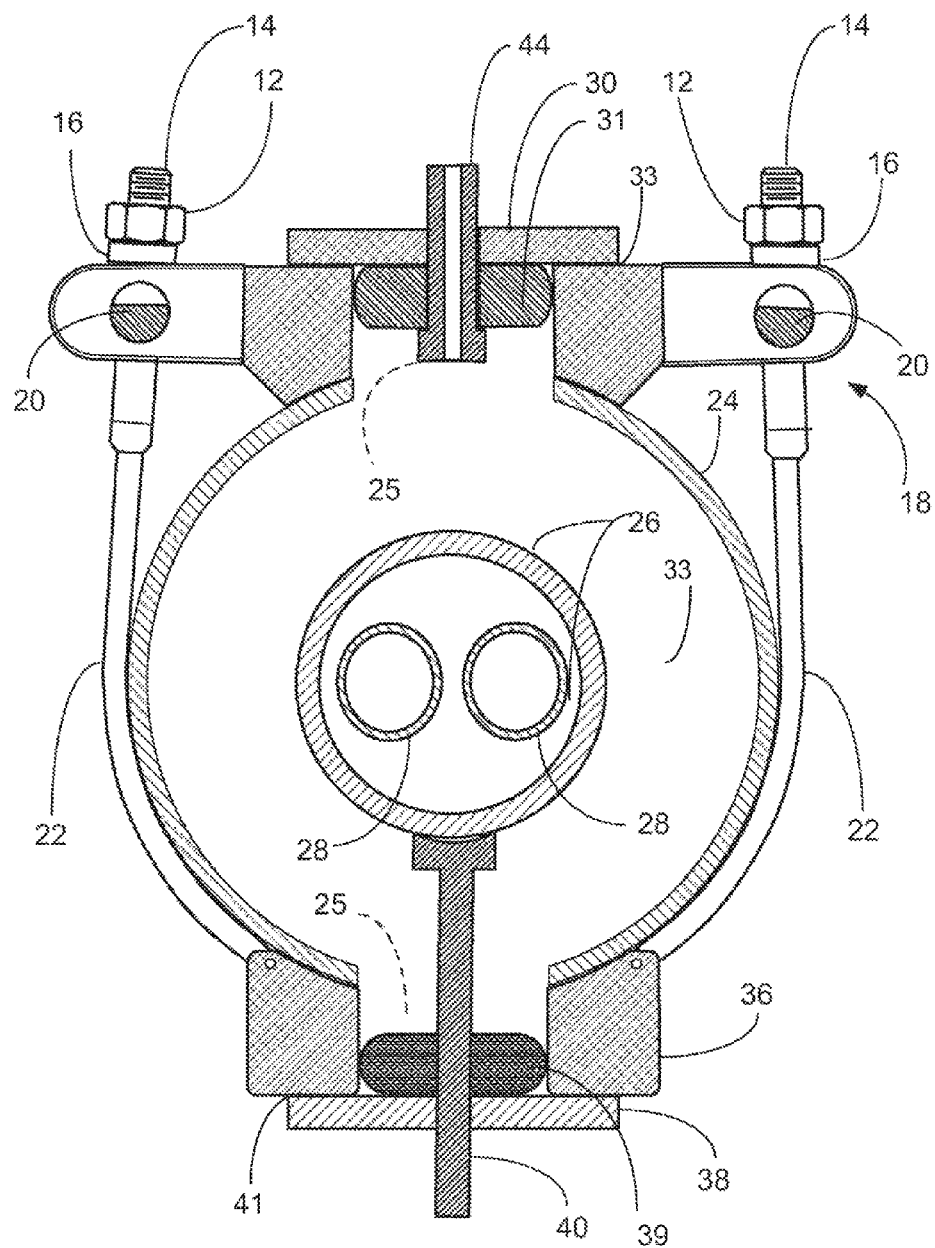
FIG. 7 illustrates a cross-section view of the hot tap assembly of the present invention modified for inner casing hot tap.

The novel System or method, as illustrated fully in the figures, and more completely in FIG. 7, is designed around two clamps (a front clamp 18 and rear clamp 36) as shown above in the drawing figures of the hot tap assembly 10. The key to the system is the larger access bores 25 in the two clamps 18, 36 which provide access to inner casing string 26 and production tubing 28. The major components of the novel System 10 would comprise a front clamp 18 with large access bore 25; rear clamp 36 with large access bore 25; a front plate 30; a replaceable hot tap seal saddle tubular 32; a front donut 31; a hot tapping seal ring 34; a rear plate 38; an adjustable rear support anvil 40; a rear donut 39; and an extension 44 for hot tap seal saddle tubular 32 positioning.

A critical feature of the multiple string hot tap system 10 includes a provision to allow the stabilization or gripping the inner string 26 or pipe 28 for hot tap drilling. Through a second access hole 25, the rear support anvil 40 is installed 180° from the hot tap seal saddle tubular 32. The casing/pipe 26 is firmly held in place. This eliminates the need to force to one side of the outer pipe 24 and insure that the inner pipe 26 will not move during the hot tap operations. It also prevents the pipe 26 that is being hot tapped from grabbing the drill and failing in buckling due to bending loads.

The multiple string hot tap system 10 shows the use of standard hot tap drilling equipment. The front plate 30 which contains the hot tap seal saddle tubular 32 has been designed to allow the uses of extensions 44 to make up the additional distance to the next pipe. As stated earlier, the multiple string hot tap system 10 also provides a rear support anvil 40 for stabilizing the inner string to be hot tapped. The rear support anvil 40 has been designed to allow position adjustment by screwing the anvil 40 in or out of the rear plate 38. The multiple string hot tap system has a wider clamp to provide more support and bearing area. The increased bearing area provides higher operating pressure. The wider clamp can provide more resistance to bending load that is created by the hot tap drilling subassembly.

The present novel System 10 is connected using a combination of roller chains 22 and chain connectors 14. The chains 22 are tensioned by applying torque to the nuts 12 on the end of the chain connector 14. The condition of a coating of Teflon (a registered Trademark of DuPont Corp.) on the chain connector threads and the nuts 12 will control the actual tension in the chain 22. On chain connectors 14 and nuts 12, with new Teflon coating, the coefficient of friction is low about 0.15 to 0.05. On chain connectors 14 and nuts 12 with worn Teflon coatings, the coefficient of friction is higher about 0.2 to 15. As the coefficient of friction rises, the tensile load for a specific torque falls. In the present hot tap system, the specified setting torque is about 50 ft-lbs to 105 ft-lbs to produce 5000 lbs. of clamping load in the chain. If a hydraulic cylinder 50, of the type illustrated in FIG. 13 was added to the chain connectors 14, the clamping load can be controlled by applying especial hydraulic pressure. The modified chain connectors 14 would replace each one of the four standard chain connectors 14 and nuts 12. This would eliminate the problems of accurately applying clamping loads. The clamping loads would be uniformly applied to each of the four chain in the hot tap clamp assembly.

As illustrated in the FIGS. 1 through 13, to carry out the method in the multiple string hot tap system 10 of the present invention, the first each casing string 24 is first hot tapped with a standard drill. The standard hot tap drill size is generally ½ to ¾ inch in diameter. Next, the multiple string hot tap clamp assembly 10 is installed on the outer casing 24 without the front plate 30 and the rear plate 38 in place. In the preferred embodiment, the centerline of the front clamp 18 and the rear clamp 36 should be aligned to insure that correct support on future operations. The chains 22 should be tensed only enough to hold the clamp assembly 10 in place. There is next provided a chain tensioning nut 12 which should be torqued to the value specified preferably by the engineer in charge of the plug and abandon operation. The torque value is based on the casing specification, hot tap pressure, and condition of the component of the hot tap assembly components. Next, the rear plate 38 with the rear support anvil 40 is installed. The position of the rear support anvil 40 should be adjusted to insure that there is a minimum gap of 0.060 inch between the rear plate 38 and the rear clamp 36 when the retainer bolts 12 are installed. The retainer bolts 12 can be replaced with 4 swing bolts and nuts. The swing bolts 12 are then pinned to the rear clamp 36. In the next step, the front plate 30 with the hot tap seal saddle tubular 32 is installed. The position of the hot-tap seal saddle tubular 32 should be adjusted to insure that the there is a minimum gap of 0.060 inch between the front plate 30 and the front clamp 18 when the retainer bolts 12 are installed. The retainer bolts 12 may be replaced with 4 swing bolts and nuts. The swing bolts are pinned to front clamp. Again, the front retainer bolts 12 should be torqued to the value specified by the engineer in charge of the plug and abandon operation. The torque value is based on the hot tap, pre-charge pressure that is required. The pre-charge pressure is usually set higher than the casing. The pressure provides an indicator when the hot tap drill breaks through the casing wall by dropping.

Next, the hot tap drilling sub assembly 10 is attached to the front plate 30 and the hot tap saddle tubular 32 as illustrated. The hot tap drilling subassembly would include the hydraulic drill or manual drill with a drill bit; the pressure gauge to monitor hot tap drill pre-charge pressure; the pressure pre-charge control valve; the hot tap vent valve; and the union.

The hot tap drilling subassembly should be pressured up to the pre-charge value that was specified by the engineer in charge of the plug and abandon operation. The casing or pipe is drilled with ½ to ¾ inch diameter bit when the bit breaks through the pipe wall, the pre-charge pressure will drop to a casing or pipe internal pressure. The casing or pipe internal pressure is vented and the hot tap drilling sub assembly 10 is removed. Next, the front plate 30 with the hot tap saddle tubular 32 is removed. The rear plate 38 with the hot tap rear support anvil 40 is removed. The rail system, which is used to support and position the large diameter drill (4 inch to 6 inch in diameter) or hole saw, is then installed on the outer casing 24 below the multiple string hot tap clamp assembly 10. If the multiple string hot tap clamp assembly 10 has to be moved or rotated to provide better support during hot tapping of an inner casing string 26, the rail system can also be used as a support while the clamp is repositioned.

Next, a probe is then run into the hot tap hole, and the location of the next inner casing string or production tubing 26 is determined. If the inner casing or pipe 26 is not located on the center line of the hot tap clamps 18, 36, the hot tap clamps must be repositioned to ensure that the next string is located in the center line of the hot tap clamps. Two access holes 25 are drilled in the outer casing 24. The first access hole 25 is drilled through the clamp 18. The second access hole 25 is drilled through the rear clamp 36. The access holes 25 will allow the hot tap saddle tubular 32 to be installed on the inner casing 26 and the rear support anvil 40 to be installed. Before the rear plate 38 is installed, the rear support anvil 40 must be adjusted. When the rear plate 38 is installed and bolted in the rear hot tap clamp 36, the rear plate 38 should have an offset gap 41 with the rear clamp 36. The rear plate 38 is now installed.

Before the front plate 30 is installed, the hot tap seal saddle tubular 32 must match the casing diameter or pipe diameter. The position of the hot tap saddle tubular 32 is adjusted by inserting the hot tap seal saddle tubular extensions 44. When the front plate 30 is installed and bolted in the front hot tap clamp 18, the front plate 30 should have an offset gap 33 with the front clamp 18. Next, the front plate 30 is installed. The front plate 30 retaining bolts or nuts 12 should be made up to the torque value that is specified by the engineer in charge of the plug and abandon operation. The torque value is based on the hot tap pre-charge pressure.

The hot tap drilling sub assembly 10 is attached to the front plate 30 and the hot tap seal saddle tubular 32. The hot tap drilling subassembly would include the hydraulic drill or manual drill with a drill bit; the pressure gauge to monitor hot tap drill pre-charge pressure; the pressure pre-charge control valve; the hot tap vent valve; and the union. The hot tap drilling subassembly should be pressured up to the pre-charge value that was specified by the engineer in charge of the plug and abandon operation. The casing or pipe is drilled with a ½ to a ¾ inch diameter bit. When the bit breaks through the pipe wall, the pre-charge pressure will drop to a casing or pipe internal pressure. The casing or pipe internal pressure is vented.

Following the venting of the internal pressure in the casing or pipe, as described above, the process is repeated for each additional inner casing layer and production tubing until the well has been drilled and the pressure vented or brought under control. For each casing layer, the multiple string hot tap seal saddle tubular 32 must be changed to match the casing or tubing diameter. In addition, seal saddle tubular extensions 44 must be added to compensate for the added distance from the multiple string hot tap clamp assembly 10.

Figure 8:
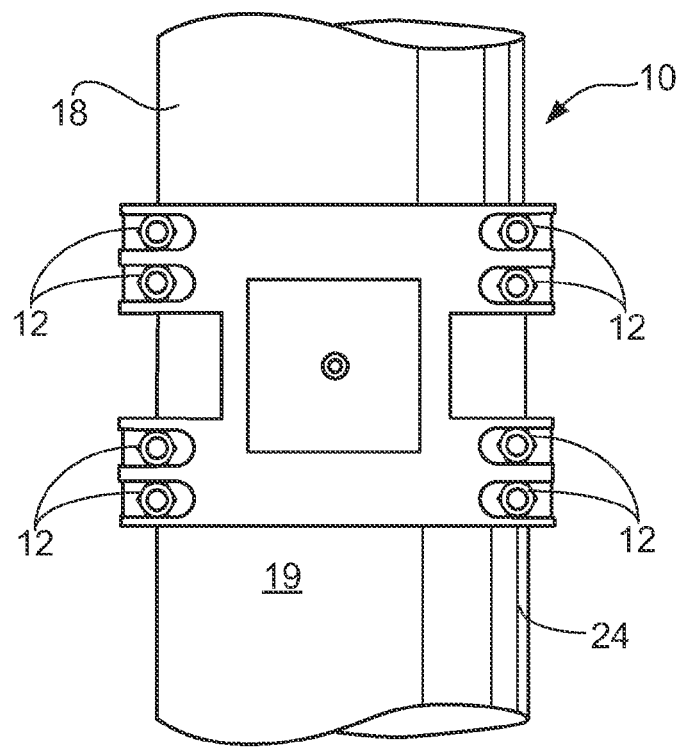
FIG. 8 illustrates the hot tap assembly with front clamp modified with larger bearing area.
Figure 9:
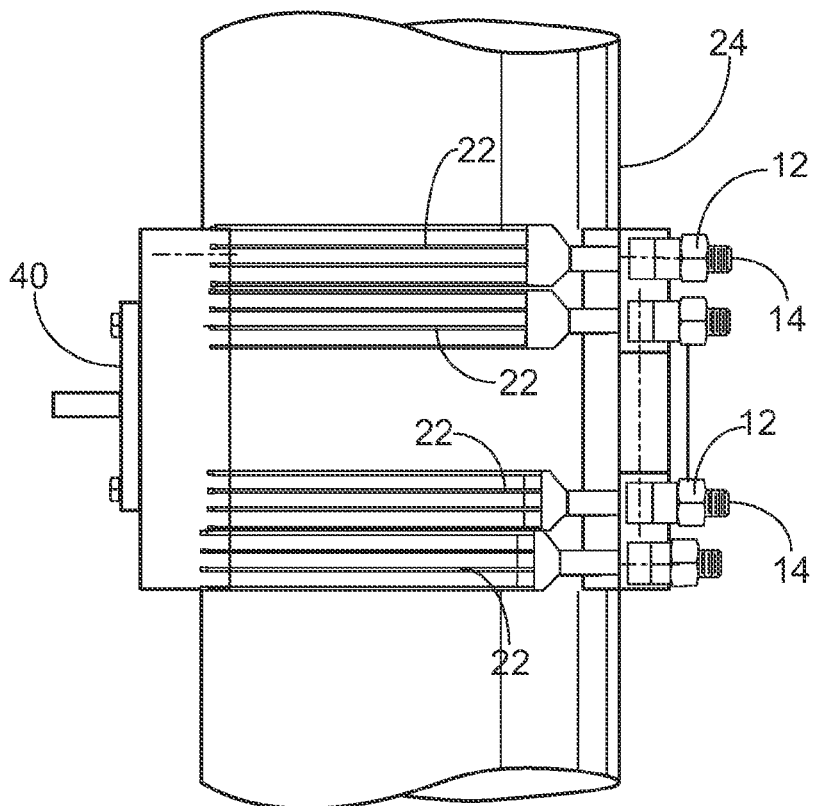
FIG. 9 illustrates a side view of the modified hot tap assembly with front clamp modified with larger bearing area.
Figure 10:
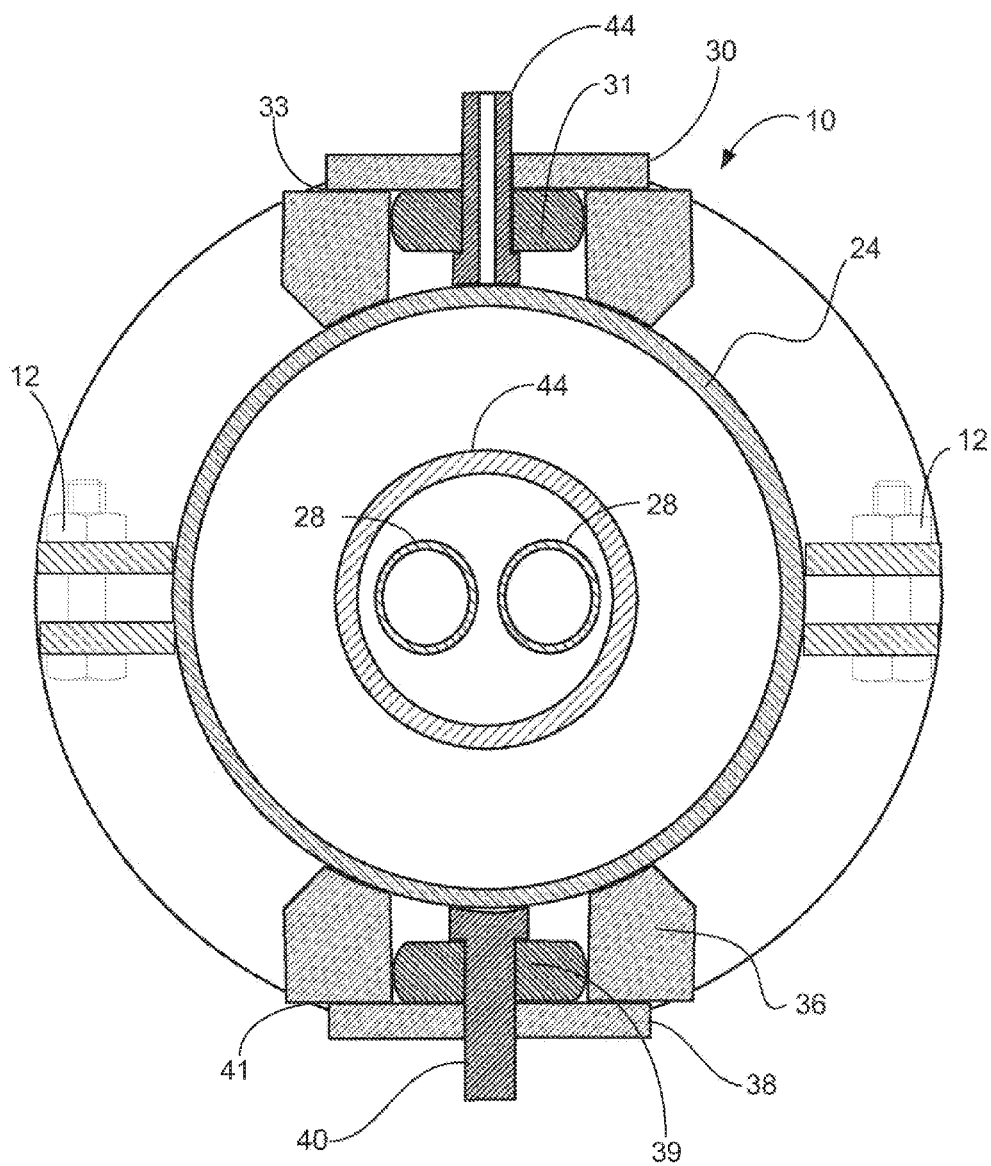
FIG. 10 illustrates a cross-section view of alternative hot tap clamp assembly of the present invention with larger access holes.

FIGS. 8 through 10 illustrate front, side and overall views respectively of the multiple string hot tap system 10 having a front clamp 18 designed to provide a larger bearing area 19, and for providing larger access holes 25 in the casing or pipe. The claim 18 is held in place by a series of four tension chains 22 secured to nuts 12.

Figure 11:
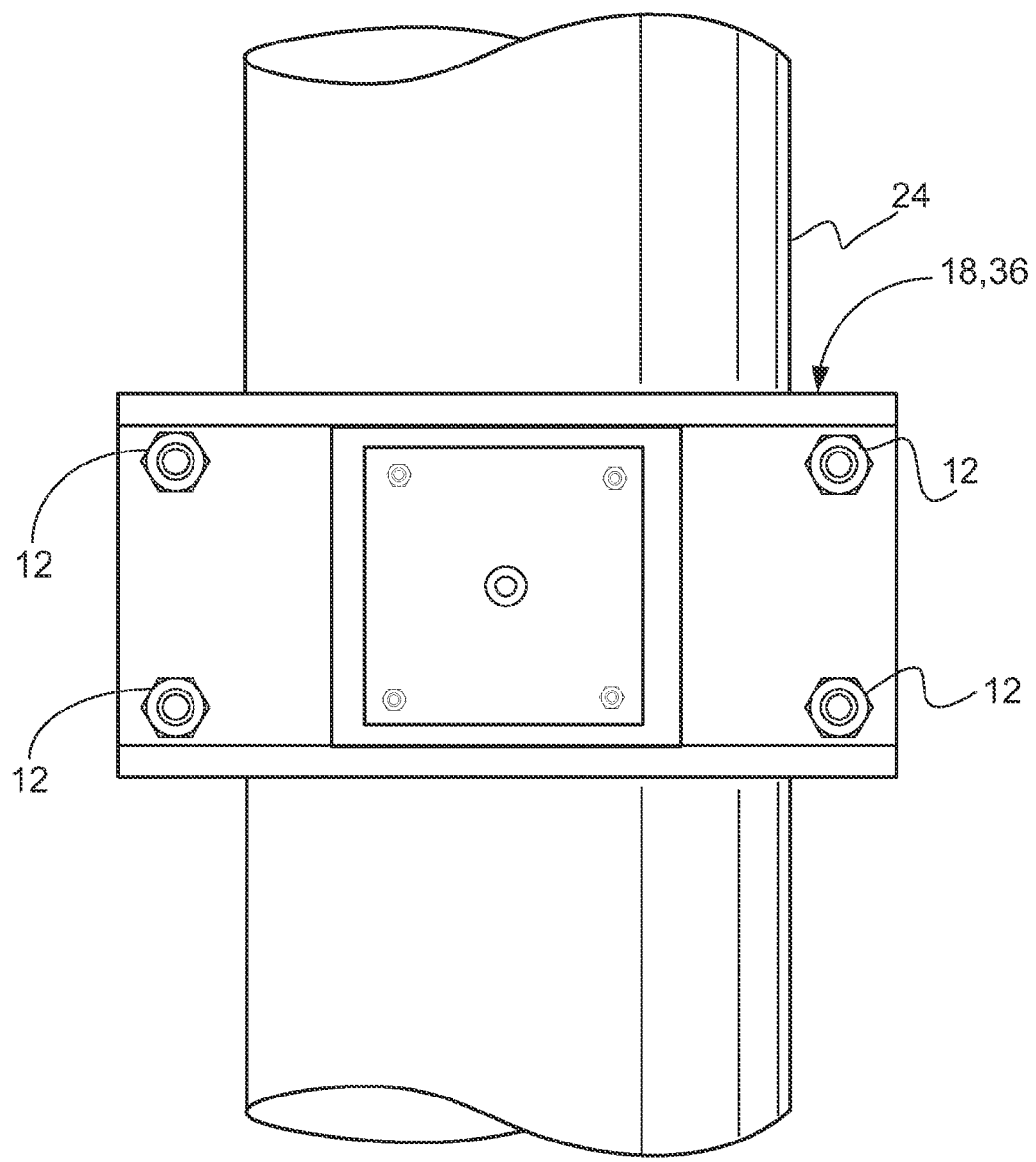
FIG. 11 illustrates a front view of alternative hot tap clamp assembly of the present invention with larger access holes.
Figure 12:
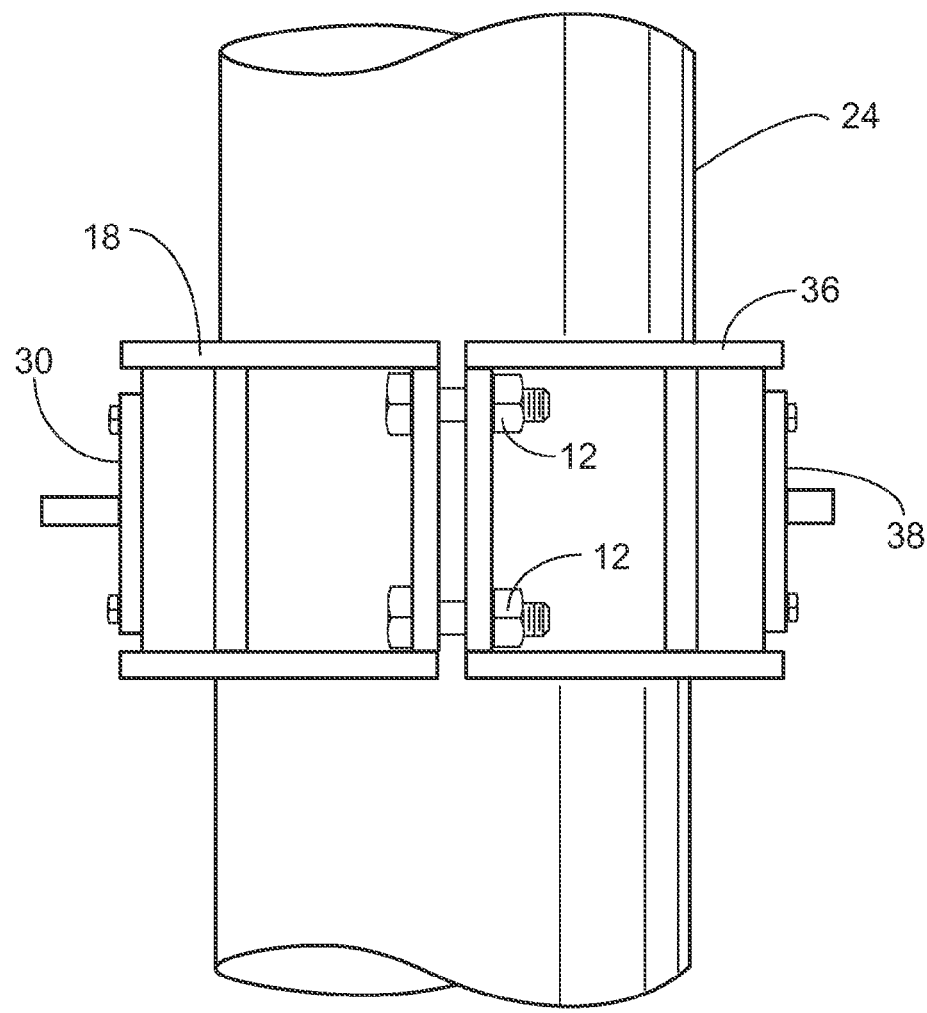
FIG. 12 illustrates a side view of alternative hot tap clamp assembly of the present invention with larger access holes.

FIGS. 11 and 12 illustrate front and side views respectively of yet another modified manner in which to secure the front and rear 18, 36 onto the wall of the casing 24 so as to provide a more stable means to hot tap the casing 24, and drill the larger access bores 25 in order to have access to the next size casing or tubing 26 and production strings 28.

Figure 13:
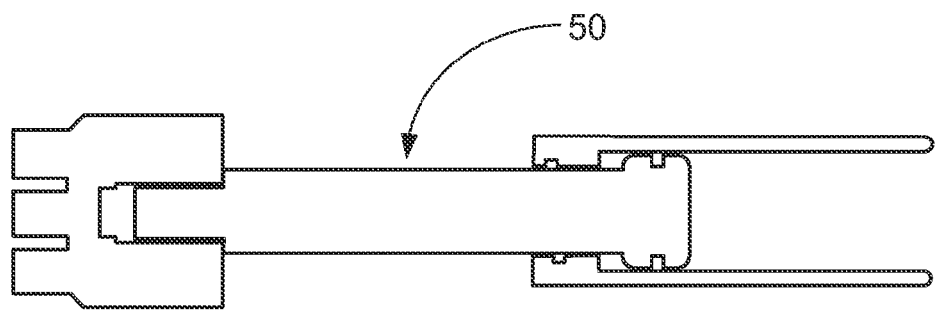
FIG. 13 illustrates a side view of the chain connector with hydraulic cylinder to better control the tensile/clamping loads in the system of the present invention.

As referenced earlier, FIG. 13 illustrates the use of a hydraulic cylinder 50 that would be engaged to the chain connectors 14, so that the clamping load can be controlled by applying especial hydraulic pressure. The modified chain connectors 14 would replace each one of the four standard chain connectors 14 and nuts 12. This would eliminate the problems of accurately applying clamping loads. The clamping loads would be uniformly applied to each of the four chain in the hot tap clamp assembly.

The following is a list of parts and materials suitable for use in the present invention.

| PARTS LIST | |
|---|---|
| Part Number | Description |
| 10 | multiple string hot tap system |
| 12 | chain tensioning nut |
| 14 | chain connector |
| 16 | washer |
| 18 | front clamp |
| 19 | larger bearing area |
| 20 | anvil |
| 22 | tension chain |
| 24 | surface casing |
| 25 | access bores |
| 26 | production casing |
| 28 | production tubing |
| 30 | front plate |
| 32 | hot tap seal saddle tubular |
| 34 | Teflon seal ring |
| 36 | rear clamp |
| 38 | rear plate |
| 40 | rear support anvil |
| 44 | extension |
| 50 | hydraulic cylinder |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A hot tapping seal assembly comprising:
   a plate, the plate comprising a hot tapping bore extending through the plate and at least one side capable of engaging with a hot tapping clamp assembly;
   a hot tapping tubular removably connected to the plate through the hot tapping bore, wherein an end of the hot tapping tubular extends through the at least one side; and
   a hot tapping seal coupled to the hot tapping tubular and capable of engaging with an outer surface of a pipe.

2. The hot tapping seal assembly of claim 1, further comprising a donut coupled to the at least one side of the plate and having a donut hole continuous with the hot tapping bore, wherein the donut is sized to encircle the hot tapping tubular and mate with an access bore of the hot tapping clamp assembly.

3. The hot tapping seal assembly of claim 2, wherein, via the donut, the hot tapping seal is capable of articulating about an angle perpendicular to the plate.

4. The hot tapping seal assembly of claim 1, wherein the hot tapping tubular is capable of receiving a seal extension to extend the distance between the hot tapping seal and the plate.

5. The hot tapping seal assembly of claim 1, wherein the hot tapping seal comprises a radius of curvature substantially matching a radius of curvature of the pipe.

6. The hot tapping seal assembly of claim 1, wherein the hot tapping tubular and hot tapping seal are one assembly.

7. A hot tapping assembly comprising:
   a hot tapping clamp comprising a clamp plate, the clamp plate capable of engaging with the outer surface of a pipe and having an access bore for accessing the outer surface of the pipe; and
   a hot tapping seal assembly comprising a seal plate engaged with the clamp plate, a tubular member having an end extending through the plate and the access bore, and a hot tapping seal connected to the tubular member and capable of engaging with the outer surface of the pipe.

8. The hot tapping assembly of claim 7, the hot tapping seal assembly further comprising an offset gap between the seal plate and the clamp plate when the hot tapping seal assembly and the clamp plate are engaged.

9. The hot tapping assembly of claim 7, wherein the tubular member and the hot tapping seal are one assembly.

* * * * *